United States Patent
Yao et al.

(10) Patent No.: US 9,690,416 B2
(45) Date of Patent: Jun. 27, 2017

(54) TOUCH PANEL, TOUCH DISPLAY PANEL AND TOUCH DETECTION AND DISPLAY METHOD

(71) Applicant: Shanghai Tianma Micro-Electronics Co., Ltd., Shanghai (CN)

(72) Inventors: Qijun Yao, Shanghai (CN); Jun Ma, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 144 days.

(21) Appl. No.: 14/058,123

(22) Filed: Oct. 18, 2013

(65) Prior Publication Data

US 2014/0043274 A1 Feb. 13, 2014

Related U.S. Application Data

(63) Continuation of application No. PCT/CN2012/085934, filed on Dec. 5, 2012.

(30) Foreign Application Priority Data

Jun. 29, 2012 (CN) .......................... 2012 1 0220465

(51) Int. Cl.
  *G06F 3/041* (2006.01)
  *G06F 3/044* (2006.01)
(52) U.S. Cl.
  CPC ............ *G06F 3/0416* (2013.01); *G06F 3/044* (2013.01); *G06F 3/0412* (2013.01); *G06F 2203/04107* (2013.01)
(58) Field of Classification Search
  CPC ...... G06F 3/044; G06F 3/0416; G06F 3/0412; G06F 17/246; G06F 17/2745;
  (Continued)

(56) References Cited

U.S. PATENT DOCUMENTS 5,386,543 A * 1/1995 Bird ..................... G06F 3/0412
  358/1.1
7,859,521 B2 12/2010 Hotelling et al.
  (Continued)

FOREIGN PATENT DOCUMENTS

AU    2011201285 A1   4/2011
CN    101408826 A     4/2009
  (Continued)

OTHER PUBLICATIONS

Extended Search Report as received in corresponding European Application No. 12873476.1, dated Jan. 25, 2016.
(Continued)

*Primary Examiner* — Kent Chang
*Assistant Examiner* — Scott Au
(74) *Attorney, Agent, or Firm* — Alston & Bird LLP

(57) ABSTRACT

A touch panel includes an array of pixels, a scan drive circuit, and a touch detection circuit. The array includes a plurality of sets of scan lines and a plurality of sets of data lines that orthogonally intersect with each other. The plurality of sets of data lines includes a first type of sets and a second type of sets that are disposed apart from each other. The scan drive circuit is electrically connected with the sets of scan lines and provides each set of the scan lines with a first scan drive signal sequentially set by set. The touch detection circuit provides the first type of sets with a touch drive signal and detects a touch sense signal from the second type of sets when each set of scan lines receives the first scan drive signal.

19 Claims, 7 Drawing Sheets

(58) Field of Classification Search
CPC ...... G06F 19/321; G06F 1/3262; G06F 3/041;
G06F 3/042; G06F 3/046
USPC ......... 345/173–179; 178/18.01–18.11, 19.01
See application file for complete search history.

(56) References Cited

U.S. PATENT DOCUMENTS

| | | |
|---|---|---|
| 2009/0273580 A1* | 11/2009 | Ota et al. ................ 345/175 |
| 2010/0194698 A1* | 8/2010 | Hotelling ............ G06F 1/3218 |
| | | 345/173 |
| 2010/0194707 A1* | 8/2010 | Hotelling ............ G06F 3/0412 |
| | | 345/173 |
| 2011/0267296 A1 | 11/2011 | Noguchi et al. |
| 2012/0002127 A1* | 1/2012 | Yamazaki ............ G09G 3/3677 |
| | | 349/43 |
| 2012/0013572 A1 | 1/2012 | Pak et al. |
| 2012/0162090 A1* | 6/2012 | Chang et al. ........... 345/173 |
| 2012/0182251 A1* | 7/2012 | Krah .................... G06F 3/0412 |
| | | 345/174 |

FOREIGN PATENT DOCUMENTS

| | | | |
|---|---|---|---|
| CN | 103309486 | A | 9/2013 |
| EP | 2214084 | A1 | 8/2010 |
| KR | 1020110122727 | A | 11/2011 |
| KR | 1020120069724 | A | 6/2012 |
| KR | 1020140039179 | A | 4/2014 |

OTHER PUBLICATIONS

Office Action as issued in corresponding Chinese Application No. 2015110401329320. dated Nov. 9, 2015.

* cited by examiner

TOUCH PANEL, TOUCH DISPLAY PANEL AND TOUCH DETECTION AND DISPLAY METHOD

CROSS-REFERENCES TO RELATED APPLICATIONS

This application claims priority to and is a continuation of PCT/CN2012/085934, filed on Dec. 5, 2012 and entitled 'TOUCH PANEL, TOUCH DISPLAY PANEL AND TOUCH DETECTION AND DISPLAY METHOD', which claims the benefit of Chinese Patent Application No. 201210220465.9, filed with the Chinese Patent Office on Jun. 29, 2012 and entitled "TOUCH PANEL, TOUCH DISPLAY PANEL AND TOUCH DETECTION AND DISPLAY METHOD", the contents of which are incorporated herein by reference in their entirety.

BACKGROUND OF THE INVENTION

Field of the Invention

The present invention relates to the field of liquid crystal display panels, and more particularly to a touch panel, a display panel equipped with a touch panel, and a method for controlling the same.

A display terminal with a touch function is increasingly popular, and integration of an active matrix display panel (e.g., a Liquid Crystal Display (LCD), an Organic Light Emitting Diode Display (OLED), etc.) with touch sensors becomes an important issue of research and development. There are on-cell touch screens and in-cell touch screens depending on whether the active matrix display panel is integrated with the touch sensors. An on-cell touch screen is known to have the active matrix display panel and the touch sensors fabricated respectively in two separate modules and then packaged together. A drawback of the on-cell touch screen lies in a large thickness and a high production cost of the entire device into which the touch sensors and the active matrix display panel are packaged. An in-cell touch screen has touch sensors integrated into the active matrix display panel to reduce the thickness and weight of the entire device. However, integration of the touch sensors into the active matrix display panel for the in-cell touch screen may bring some problems. For example, problems may be caused by a parasitic capacitance between two parts, a change in electric field of liquid crystal cells resulting from additional touch sense electrodes, degraded performance of devices, a lowered aperture ratio, etc. Moreover, the touch sensors of most of existing in-cell touch screens have to be fabricated in an extra process, thereby increasing production cost. Fabrication of the touch sensors based on the structure of the active matrix display panel itself can lower the production cost greatly and further lower the thickness of the touch display panel into which the both are integrated.

FIG. 1 illustrates a schematic structural diagram of touch sensors fabricated from a common electrode layer of a liquid crystal display panel in the related art.

Referring to FIG. 1, touch sensors are fabricated from a common electrode layer 100 in a liquid crystal display panel integrated with a touch screen in the related art. The common electrode layer 100 includes a plurality of common electrodes 101 arranged in a matrix. To detect a touch, the common electrode layer 100 is divided into drive areas that are spaced apart from each other. The common electrode layer 100 includes a sense area 103 and several drive area segments 102. When the drive area and the sense area 103 work, extra lead lines are needed for common electrodes layer 100 to realize mode shifting. The extra lead lines will increase process complexity and further increase production cost.

BRIEF SUMMARY OF THE INVENTION

Embodiments of the present invention provide a touch panel, a touch display panel and, a touch detection and display method For solving the foregoing problems.

According to one embodiment of the present invention, a touch panel includes an array of pixels having a plurality of sets of scan lines, a plurality of sets of data lines intersecting orthogonally with the plurality of sets of scan lines, and a plurality of pixel elements coupled respectively with the plurality of sets of scan lines and the plurality of sets of data lines. The plurality of sets of data lines includes a first type of sets and a second type of sets disposed apart from each other. The touch panel further includes a first scan drive circuit electrically connected with the plurality of sets of scan lines and configured to provide each of the sets of scan lines with a first scan drive signal sequentially set by set, and a touch detection circuit electrically connected with the plurality of sets of data lines and configured to provide the first type of sets of the plurality of sets of data lines with a touch drive signal and to detect a touch sense signal from the second type of sets among the plurality of sets of data lines when each set of scan lines receives the first scan drive signal.

In order to solve the foregoing problem, an embodiment of the present invention further provides a touch detection method of the touch panel. The touch panel may include in part elements mentioned in sections above. The method includes:

a step of providing one set of scan lines with a first scan drive signal by a first scan drive circuit (step 1);

when the scan drive circuit provides the first scan drive signal, a step of providing a first type of sets of a plurality of sets of data lines with a touch drive signal by a touch detection circuit (step 2), a step of detecting the touch sense signal from a second type of sets of the plurality of sets of data lines by the touch detection circuit (step 2);

a step of providing a next set of scan lines with the first scan drive signal by the scan drive circuit (step 3); and performing the step of providing the first type of sets of the plurality of sets of data lines with the touch drive signal by the touch detection circuit, and the step of detecting the touch sense signal from the second type of sets of the plurality of sets of data lines by the touch detection circuit (step 2), wherein the two sets of scan lines (the one set of scan lines and the next set of scan lines mentioned above) are adjacent, and the next set of scan lines was not provided with the first scan drive signal.

According to another embodiment of the present invention, a touch display panel includes an array of pixels having a plurality of sets of scan lines, a plurality of sets of data lines intersecting orthogonally with the plurality of sets of scan lines, and a plurality of pixel elements coupled respectively with the plurality of sets of scan lines and the plurality of sets of data lines. The plurality of sets of data lines includes a first type of sets and a second type of sets disposed apart from each other. The touch display panel also includes a first scan drive circuit electrically connected with the plurality of sets of scan lines and configured to provide each of the sets of scan lines with a first scan drive signal sequentially set by set, and a touch detection circuit electrically connected with the plurality of sets of data lines and configured to provide the first type of sets among the plurality of sets of data lines with a touch drive signal and to detect a touch sense signal from the second type of sets of the plurality of sets of data lines when each set of scan lines receives the first scan drive signal. The touch display panel also includes a second scan drive circuit electrically connected with the plurality of sets of scan lines to provide each set of scan lines with a second scan drive signal after the set of scan lines receives the first scan drive signal, and a data drive circuit electrically connected with the plurality of sets of data lines and configured to provide the plurality of sets of data lines with an image data signal when each set of scan lines receives the second scan drive signal.

In order to solve the foregoing problem, the present invention further provides a touch detection and display method for a touch display panel (a display panel equipped with a touch panel). The method includes:

step 1, providing, by a first scan drive circuit, one set of scan lines with a first scan drive signal;

step 2, when the first scan drive circuit provides the first scan drive signal, applying, by a touch detection circuit, a touch drive signal to a first type of sets of a plurality of sets of data lines, and detecting, by the touch detection circuit, a touch sense signal from a second type of sets of the plurality of sets of data lines;

step 3, after the first scan drive circuit provides the first scan drive signal, providing, by a second scan drive circuit, the set of scan lines with the second scan drive signal;

step 4, when the second scan drive circuit provides the second scan drive signal, providing, by the data drive circuit, the plurality of sets of data lines with an image data signal; and step 5, providing, by the first scan drive circuit, a next set of scan lines with the first scan drive signal and performing the step 2, wherein the two sets of scan lines (the one set of scan lines and the next set of scan lines mentioned above) are adjacent, and the second set of scan lines was not provided with the first scan drive signal.

DETAILED DESCRIPTION OF THE INVENTION

Exemplary embodiments of a touch panel, a touch display panel and, a touch detection and display method according to the present invention will be described below in details in connection with the drawings.

First Embodiment

Figure 1:
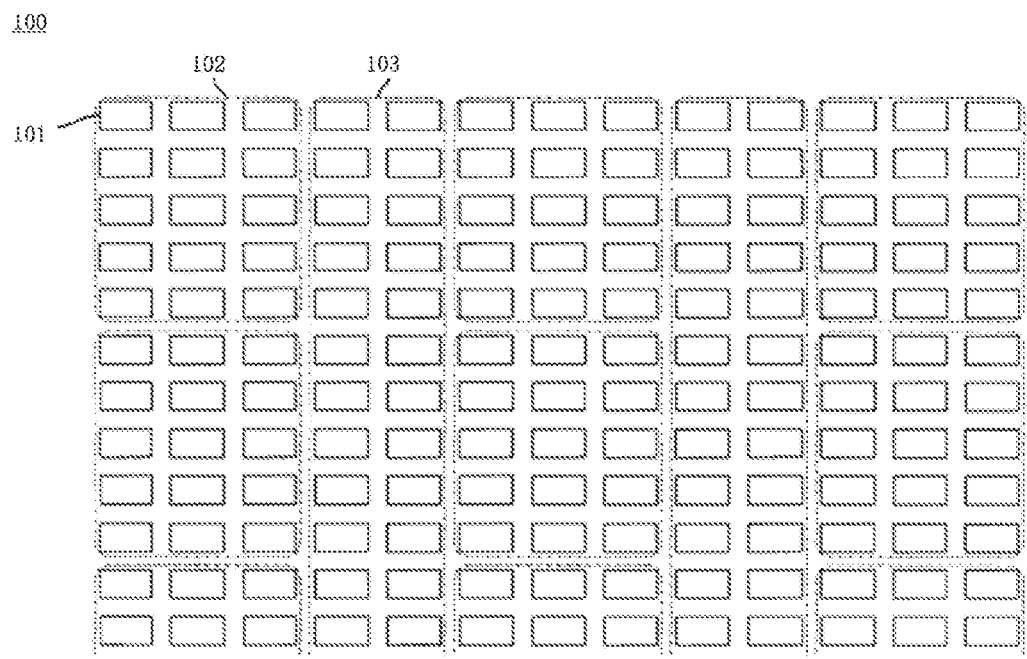
FIG. 1 is a schematic structural diagram of fabrication of touch sensors from a common electrode layer of a liquid crystal display panel in the related art.
Figure 2A:
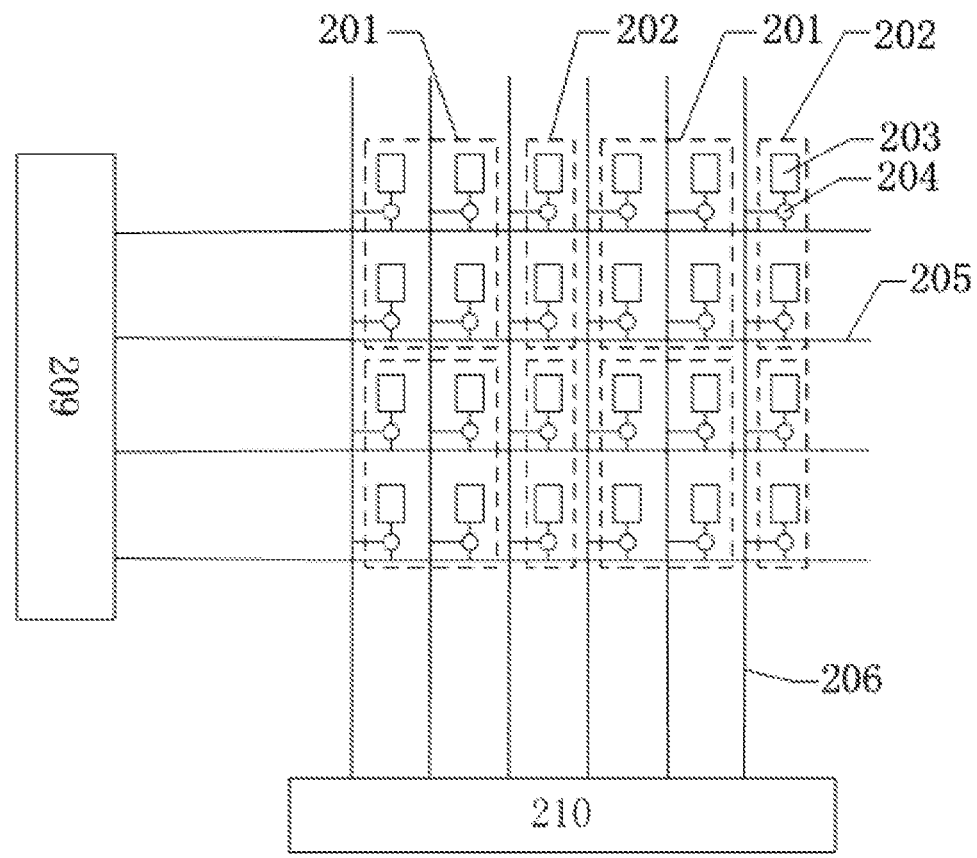
FIG. 2A is a schematic structural diagram of a first embodiment of a touch panel according to the present invention.

FIG. 2A illustrates a schematic structural diagram of a touch panel according to this embodiment.

This embodiment provides a touch panel including:

An array of pixels which includes a plurality of sets of scan lines 205, a plurality of sets of data lines 206 intersecting orthogonally with the plurality of sets of scan lines 205, and a plurality of pixel elements coupled respectively with the plurality of sets of scan lines 205 and the plurality of sets of data lines 206, wherein the plurality of sets of data tines 206 includes a first type of sets and a second type of sets distributed to be spaced apart from each other. Specifically, each of the plurality of pixel elements is arranged at the intersection of a scan line 205 and a data line 206, and each pixel element includes at least one pixel electrode 203 and one pixel switch 204, and the pixel electrode 203 is coupled respectively with the corresponding scan line 205 and data line 206 through the pixel switch 204. In this embodiment, each pixel element includes one pixel electrode 203 and one pixel switch 204, and each pixel electrode 203 corresponds respectively to one data line 206 and one scan line 205, and two adjacent pixel electrodes 203 correspond separately to one data line 206 and one scan line 205 respectively. Typically, the pixel switch 204 can be a Thin Film field effect Transistor (TFT). The pixel electrode 203 being coupled respectively with the corresponding scan line 205 and data line 206 through the pixel switch 204 particularly means that the pixel electrode 203 is coupled respectively with the corresponding scan line 205 and data line 206 through the TFT, and the TFT has a gate electronically connected with the scan line 205, a source electronically connected with the data line 206 and a drain electronically connected with the pixel electrode 203.

Particularly two adjacent pixel electrodes 203 corresponding separately to one data line 206 and one scan line 205 respectively refers to that the pixel electrodes 203 in the same row corresponds to the same scan line but corresponds respectively to different data lines; and the same column of pixel electrodes 203 corresponds to the same data line but corresponds respectively to different scan lines.

Each set of the plurality of sets of scan lines 205 includes one or more scan lines 205; and each set of the plurality of sets of data lines 206 includes one or more data lines 206.

The number of scan lines 205 in each set may be the same or different. Preferably the number of scan lines 205 in each set is the same.

In an optional implementation, the number of scan lines 205 in each set ranges from 2 to 1000. As illustrated in FIG. 2A, for example, there are two sets of scan lines 205 in total in the array of pixels, and there are two scan lines in each set, where the first set of scan lines includes two upper scan lines 205, and the second set of scan lines includes two lower scan lines 205.

The number of data lines 206 in each set of the same type of sets of data lines 206 is the same or different. Preferably the number of data lines 206 in each set of the same type of sets of data lines 206 is the same.

In an optional implementation, the number of data lines 206 in each set ranges from 2 to 1000. For example, the data lines 206 in the array of pixels in FIG. 2A include four sets, where two sets are the first type of sets and two sets are the second type of sets distributed to be spaced apart from the first type of sets. Counting from the left to the right, the first set of the first type of sets of data lines 206 includes the first and the second data lines 206, and the second set of the first type of sets of data lines 206 includes the fourth and the fifth data lines 206; and counting from the left to the right, the first set of the second type of sets of data lines 206 includes the third data lines 206, and the second set of the second type of sets of data lines 206 includes the sixth data lines 206.

The touch panel further includes a first scan drive circuit 209 electrically connected with the plurality of sets of scan lines 205 to provide the respective sets of scan lines 205 with a first scan drive signal sequentially set by set.

The touch panel further includes a touch detection circuit 210 electrically connected with the plurality of sets of data lines 206, and when each set of scan lines 205 receives the first scan drive signal, the touch detection circuit 210 provides the first type of sets of the plurality of sets of data lines 206 with a touch drive signal and detects a touch sense signal from the second type of sets of the plurality of sets of data lines 206.

"Sequentially set by set" mentioned in this application refers to operation set by set in a logic order of sets. As illustrated in FIG. 2A, for example, the first scan drive circuit 209 provides the respective sets of scan lines 205 with a first scan drive signal sequentially set by set, in other words, firstly the first scan drive circuit 209 provides the first set of scan lines 205 with the first scan drive signal, and then the first scan drive circuit 209 provides the second set of scan lines 205 with the first scan drive signal.

The array of pixels is divided by the first type of sets and the second type of sets of data lines in combination with the scan lines into four drive areas 201 and four sense areas 202, where the first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204; and the first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204. The pixel electrodes 203 in the drive areas 201 function as touch drive electrodes in a touch mode, and the pixel electrodes 203 in the sense areas 202 function as touch sense electrodes in the touch mode. Mutual capacitances are formed between the pixel electrodes 203 in the drive areas 201 and the pixel electrodes 203 in the sense areas 202.

In an optional implementation, the first type of sets are odd sets, and the second type of sets are even sets. Alternatively, the first type of sets are even sets, and the second type of sets are odd sets.

Figure 2B:
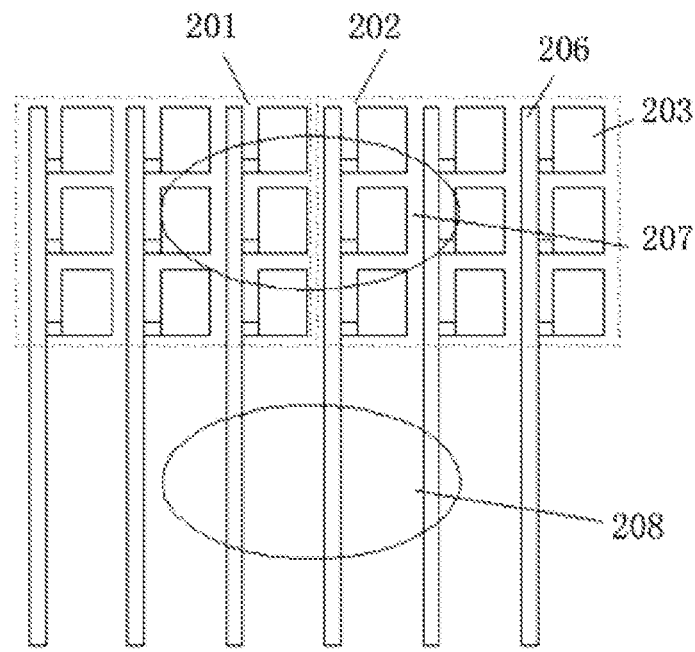
FIG. 2B is a schematic structural diagram of a segment of an array of pixels in an optional implementation of a second embodiment of a touch panel according to the present invention.

FIG. 2B illustrates a schematic structural diagram of a segment of the array of pixels in an optional implementation of the touch panel according to this embodiment.

In an optional implementation, as illustrated in FIG. 2B, each set of the first type of sets of data lines 206 and the second type of sets of data lines 206 includes three data lines, and each set of scan lines 205 also includes three scan lines. FIG. 2B illustrates a segment of the array of pixels, which includes two sets of scan lines 205 (not illustrated), one first type of set of data lines 206 (the first to third data lines 206 starting from the left) and one second type of set of data lines 206 (the fourth to sixth datalines 206 starting from the left), where each pixel element includes one TFT switch (not illustrated) and one pixel electrode 203. When the first drive signal is applied correspondingly to the first set of scan lines 205 and the second set of scan lines 205 are floating, then all the pixel electrodes 203 corresponding to the first set of scan lines 205 are turned on, and the pixel electrodes 203 corresponding to the second set of scan lines 205 are turned off (the turned-off pixel electrodes not illustrated in FIG. 2B). Then the touch detection circuit applies the touch drive signal to the first type of set of data lines 206 to thereby apply the touch drive signal to the drive areas 201. Next the touch detection circuit detects the touch sense signal from the sense areas 202 through the second type of set of data lines 206. Mutual capacitances are formed between the pixel electrodes 203 in the drive areas 201 and the pixel electrodes 203 in the sense areas 202 so that a touch action of a finger or a stylus in the first touch area 207 can be detected by the touch detection circuit.

A touch action of the finger or the stylus in the second touch area 208 will also be detected by the touch detection circuit together with a change in mutual capacitance between the first type of set of data lines 206 and the second type of set of data lines 206. This results from significantly smaller mutual capacitances between the data lines 206 (that is, of areas surrounded by the second set of scan lines 205) than those between the large-area pixel electrodes 203 (that is, of areas surrounded by the first set of scan lines 205).

Thus the signal of the second touch area 208 can be distinguished from that in the first touch area 207.

That is, when there are touch actions in both the first touch area 207 and the second touch area 208, the touch action of the first touch area 207 has a parasitic capacitance arising between the pixel electrodes in the corresponding drive area or sense area and the touch object (the finger or the stylus), and the sum of the parasitic capacitances and the original mutual capacitances (the capacitance between the pixel electrodes of the drive area and the pixel electrodes of the sense area) is a changed mutual capacitance of the areas, and this change in mutual capacitance is detected, that is, the touch action of the touch object (the finger or the stylus) in the first touch area 207 is detected. The touch action of the second touch area 208 has a parasitic capacitance arising between the data lines in the corresponding drive area or sense area and the touch object, and the sum of the parasitic capacitances and the original mutual capacitances is a changed mutual capacitance of the areas, and this change in mutual capacitance is also detected, that is, the touch action of the touch object (the finger or the stylus) in the second touch area 208 is detected. However, since the scan lines corresponding to the second touch area 208 are floating, the corresponding thin film transistors are turned off, the corresponding pixel electrodes do not contribute to the change in mutual capacitance, and only the data lines of the area contribute to the change in mutual capacitance, but the data lines contribute little to the change in mutual capacitance, thus the touch action of the first touch area 207 can be distinguished from that of the second touch area 208 and furthermore the touch action of the second touch area 208 can be ignored to avoid a misjudgment.

Figure 2C:
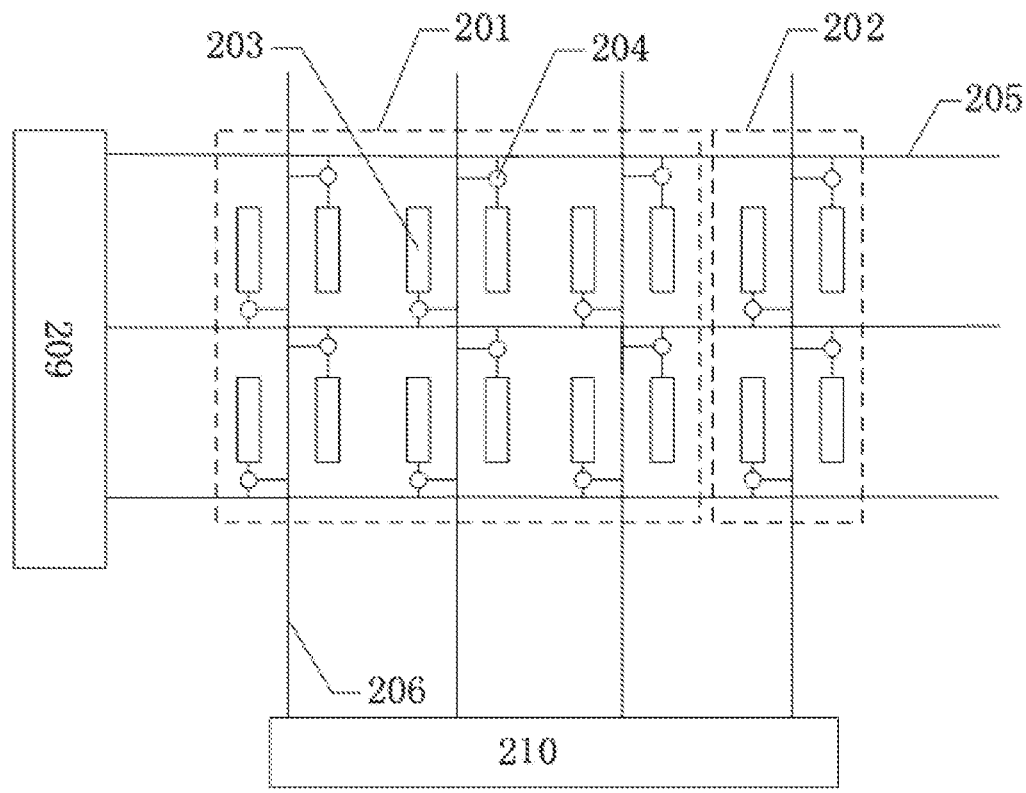
FIG. 2C a schematic structural diagram of an optional implementation of the second embodiment of a touch panel according to the present invention.

FIG. 2C is a schematic structural diagram of an optional implementation of the touch panel according to this embodiment.

The touch panel illustrated in FIG. 2C includes an array of pixels including a plurality of sets of scan lines 205, a plurality of sets of data lines 206 intersecting vertically with the plurality of sets of scan lines 205, and a plurality of pixel elements coupled respectively with the plurality of sets of scan lines 205 and the plurality of sets of data lines 206, and each pixel element includes one pixel electrode 203 and one pixel switch 204. The touch panel further includes a first scan drive circuit 209 and a touch detection circuit 210. For a description of the first scan drive circuit 209 and the touch detection circuit 210, a reference can be made to the embodiment corresponding to FIG. 2A above, and a repeated description thereof will be omitted here.

In an optional implementation, as illustrated in FIG. 2C, the array of pixels is distributed in a dual gate arrangement, that is, the pixel electrodes 203 of the same row share two scan lines 205, and every two adjacent columns of pixels share one data line 206. In FIG. 2C, counting from the left to the right, the pixel electrodes 203 in the same row located in an odd column are coupled with one of the scan lines 205 through the pixel switch 204, and the pixel electrodes 203 located in an even column are coupled with another scan line 205 through the pixel switch 204; and counting from the left to the right, all the pixel electrodes 203 in the first column and the second column are coupled with the first data line 206 through the pixel switches 204, all the pixel electrodes 203 in the third column and the fourth column are coupled with the second data line 206 through the pixel switches 204, and so on.

In the touch panel illustrated in FIG. 2C, a drive area 201 includes twelve pixel electrodes 203 coupled respectively with each scan line 205 and three data lines 206 from the left through the pixel switches 204. A sense area 202 includes four pixel electrodes 203 coupled respectively with each scan line 205 and the fourth data line 206 from the left through the pixel switches 204. For a description of the drive area 201 and the sense area 202, a reference can be made to the embodiment corresponding to FIG. 2A above, and a repeated description thereof will be omitted here.

Figure 2D:
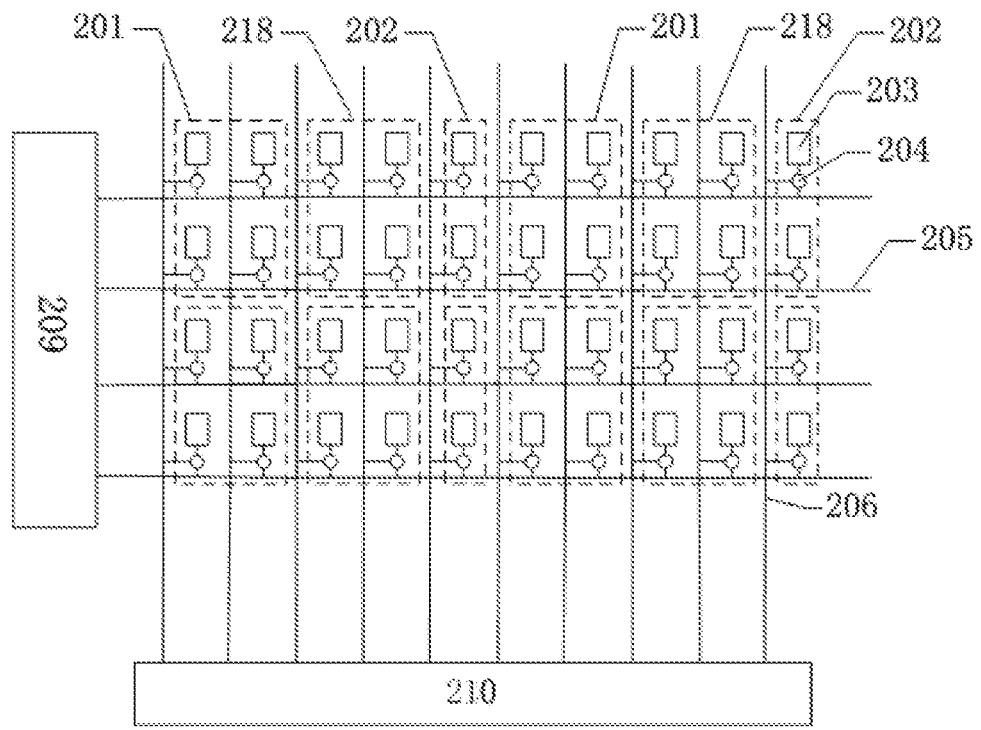
FIG. 2D a schematic structural diagram of an optional implementation of the second embodiment of a touch panel according to the present invention.

FIG. 2D is a schematic structural diagram of an optional implementation of the touch panel according to this embodiment.

Based upon the embodiment corresponding to FIG. 2A, in an optional implementation, the plurality of sets of data lines further include a third type of sets which are located between the first type of sets and the second type of sets and to which the touch detection circuit 210 applies a fixed potential.

As illustrated in FIG. 2D, the array of pixels is divided by the first type of sets, the second type of sets and the third type of sets of data lines in combination with the scan lines into four drive areas 201, four sense areas 202 and four fixed-potential areas 218. Counting from the left to the right, there are the first to the tenth data lines illustrated; and counting from the top to the bottom, there are the first to the fourth scan lines illustrated in total.

The first set of the first type of sets of data lines 206 includes the first and the second data lines 206. The first set of the third type of sets of data lines 206 includes the third and the fourth data lines 206. The first set of the second type of sets of data lines 206 includes the fifth data line 206. The second set of the first type of sets of data lines 206 includes the sixth and the seventh data lines 206. The second set of the third type of sets of data lines 206 includes the eighth and the ninth data lines 206. The second set of the second type of sets of data lines 206 includes the tenth data line 206.

The first set of scan lines 205 includes the first and the second scan lines 205. The second set of scan lines 205 includes the third and the fourth scan lines 205.

The first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204.

The first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204.

The first fixed-potential area 218 includes four pixel electrodes 203 coupled respectively with the first set of scan lines 205 and the first set of the third type of sets of data lines 206 through the pixel switches 204, the second fixed-potential area 218 includes four pixel electrodes 203 coupled respectively with the first set of scan lines 205 and the second set of the third type of sets of data lines 206 through the pixel switches 204, the third fixed-potential area 218 includes four pixel electrodes 203 coupled respectively with the second set of scan lines 205 and the first set of the third type of sets of data lines 206 through the pixel switches 204, and the fourth fixed-potential area 218 includes four pixel electrodes 203 coupled respectively with the second set of scan lines 205 and the second set of the third type of sets of data lines 206 through the pixel switches 204.

The pixel electrodes 203 in the drive areas 201 function as touch drive electrodes in a touch mode; the pixel electrodes 203 in the sense areas 202 function as touch sense electrodes in the touch mode; and the fixed potential is applied to the pixel electrodes 203 in the fixed-potential area 218 in the touch mode, and typically the fixed potential is a grounded potential.

Figure 2E:
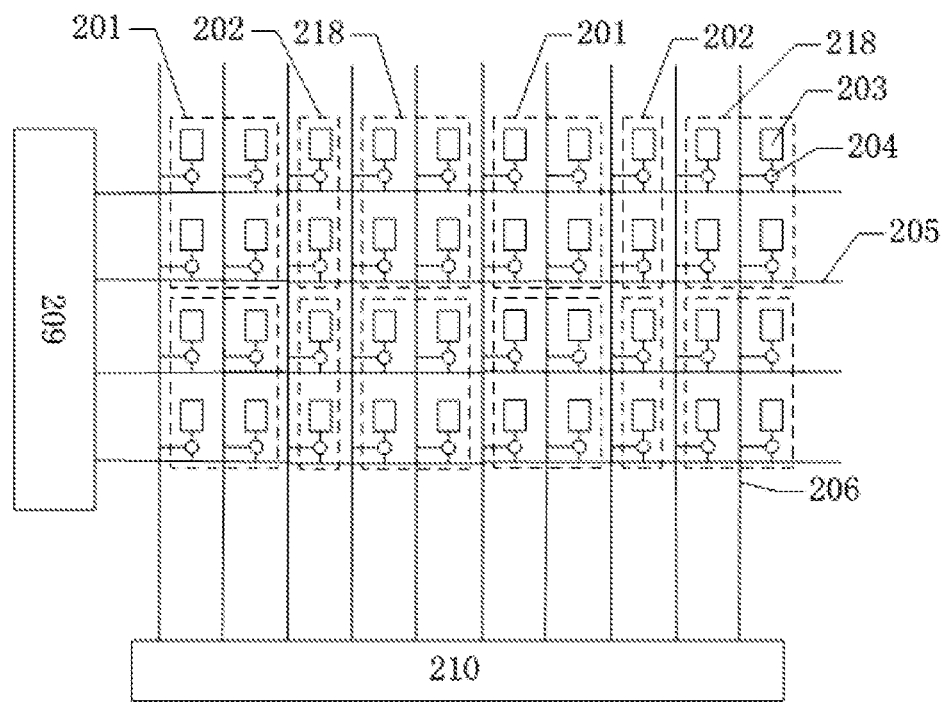
FIG. 2E a schematic structural diagram of an optional implementation of the second embodiment of a touch panel according to the present invention.

FIG. 2E is a schematic structural diagram of an optional implementation of the touch panel according to this embodiment.

Based upon the embodiment corresponding to FIG. 2A, as illustrated in FIG. 2E, the plurality of sets of data lines further include a third type of sets, and the second type of sets are located between the first type of sets and the third type of sets; and the touch detection circuit 210 applies a fixed potential to the third type of sets.

As illustrated in FIG. 2E, the array of pixels is divided by the first type of sets, the second type of sets and the third type of sets of data lines in combination with the scan lines into four drive areas 201, four sense areas 202 and four fixed-potential areas 218. Counting from the left to the right, there are the first to the tenth data lines illustrated; and counting from the top to the bottom, there are the first to the fourth scan lines illustrated in total.

The first set of the first type of sets of data lines 206 includes the first and the second data lines 206. The first set of the third type of sets of data lines 206 includes the fourth and the fifth data lines 206. The first set of the second type of sets of data lines 206 includes the third data line 206. The second set of the first type of sets of data lines 206 includes the sixth and the seventh data lines 206. The second set of the third type of sets of data lines 206 includes the ninth and the tenth data lines 206. The second set of the second type of sets of data lines 206 includes the eighth data line 206.

The first set of scan lines 205 includes the first and the second scan lines 205. The second set of scan lines 205 includes the third and the fourth scan lines 205.

The first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204.

The first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204.

The first fixed-potential area 218 includes four pixel electrodes 203 coupled respectively with the first set of scan lines 205 and the first set of the third type of sets of data lines 206 through the pixel switches 204, the second fixed-potential area 218 includes four pixel electrodes 203 coupled respectively with the first set of scan lines 205 and the second set of the third type of sets of data lines 206 through the pixel switches 204, the third fixed-potential area 218 includes four pixel electrodes 203 coupled respectively with the second set of scan lines 205 and the first set of the third type of sets of data lines 206 through the pixel switches 204, and the fourth fixed-potential area 218 includes four pixel electrodes 203 coupled respectively with the second set of scan lines 205 and the second set of the third type of sets of data lines 206 through the pixel switches 204.

The pixel electrodes 203 in the drive areas 201 function as touch drive electrodes in a touch mode; the pixel electrodes 203 in the sense areas 202 function as touch sense electrodes in the touch mode; and the fixed potential is applied to the pixel electrodes 203 in the fixed-potential area 218 in the touch mode, and typically the fixed potential is a grounded potential.

In another optional implementation of the touch panel according to an embodiment of the present invention, like the embodiment as illustrated in FIG. 2E, the plurality of sets of data lines further include a third type of sets, and the first type of sets are located between the second type of sets and the third type of sets; and the touch detection circuit 210 applies a fixed potential to the third type of sets. For a particular implementation thereof, reference can be made to the embodiment illustrated in FIG. 2E, and a repeated description thereof will be omitted here.

In an optional implementation, the touch panel further includes a control circuit (not illustrated) electrically connected with the first scan drive circuit and the touch detection circuit to coordinate operating timing between the first scan drive circuit and the touch detection circuit. For a particular operation mode thereof, reference can be made to a second embodiment.

Second Embodiment

Figure 3:
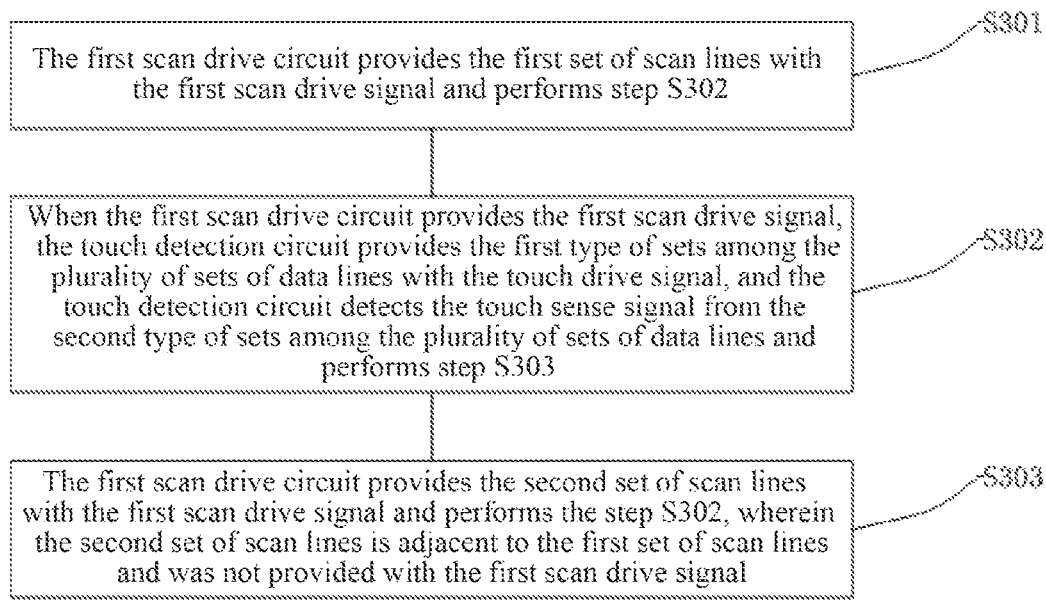
FIG. 3 is a flow chart of steps in a second embodiment of a touch detection method of a touch panel according to the present invention.

FIG. 3 illustrates a flow chart of steps in a touch detection method of a touch panel according to this embodiment.

This embodiment provides a touch detection method of a touch panel, where an array of pixels of the touch panel has been disclosed in the first embodiment, and the method includes the following steps:

Step S301, the first scan drive circuit provides the first set of scan lines with the first scan drive signal. At step S301, all the scan lines in the first set of scan lines 205 receive the first scan drive signal at the same time when the set of scan lines 205 receives the first scan drive signal.

Step S302, when the first scan drive circuit provides the first scan drive signal, the touch detection circuit provides the first type of sets among the plurality of sets of data lines with the touch drive signal, and the touch detection circuit detects the touch sense signal from the second type of sets among the plurality of sets of data lines.

Furthermore at step S302, the touch detection circuit 210 provides the first type of sets of the plurality of sets of data lines 206 with the touch drive signal and applies the touch drive signal to the pixel electrodes 203 in the drive areas 201 through the first type of sets of data lines 206, where the pixel electrodes 203 in the drive areas 201 function as touch drive electrodes.

In an optional implementation, at step S302, when the first scan drive circuit provides the first scan drive signal, the touch detection circuit provides the first type of sets among the plurality of sets of data lines with the touch drive signal, and at the same time the touch detection circuit detects the touch sense signal from the second type of sets among the plurality of sets of data lines.

In an optional implementation, at step S302, when the first scan drive circuit provides the first scan drive signal, firstly the touch detection circuit provides the first type of sets among the plurality of sets of data lines with the touch drive signal, and then the touch detection circuit detects the touch sense signal from the second type of sets among the plurality of sets of data lines.

Furthermore at step S302, the pixel electrodes 203 of the sense areas 202 transmits the touch sense signal to the second type of sets of data lines 206, and at this time the pixel electrodes 203 of the sense areas 202 function as touch sense electrodes; and the touch detection circuit 210 detects the touch sense signal from the second type of sets of the plurality of sets of data lines 206.

Step 303, the first scan drive circuit provides the second set of scan lines with the first scan drive signal and performs step S302, wherein the second set of scan lines is adjacent to the first set of scan lines and was not provided with the first scan drive signal.

Another touch detection method of a touch panel according to this embodiment includes the following operations:

The first scan drive circuit provides a set of scan lines with the first scan drive signal. In this step, the first scan drive circuit provides all the scan lines 205 in the set of scan lines 205 with the first scan drive signal at the same time.

When the first scan drive circuit provides the first scan drive signal, the touch detection circuit provides the first type of sets among the plurality of sets of data lines with the touch drive signal, and the touch detection circuits detects the touch sense signal from the second type of sets among the plurality of sets of data lines.

Then the first scan drive circuit provides a next set of scan lines with the first scan drive signal, and when the first scan drive circuit provides the first scan drive signal, the touch detection circuit provides the first type of sets among the plurality of sets of data lines with the touch drive signal, and the touch detection circuits detects the touch sense signal from the second type of sets among the plurality of sets of data lines, wherein the two sets of scan lines are adjacent, and the next set of scan lines was not provided with the first scan drive signal.

Third Embodiment

Figure 4A:
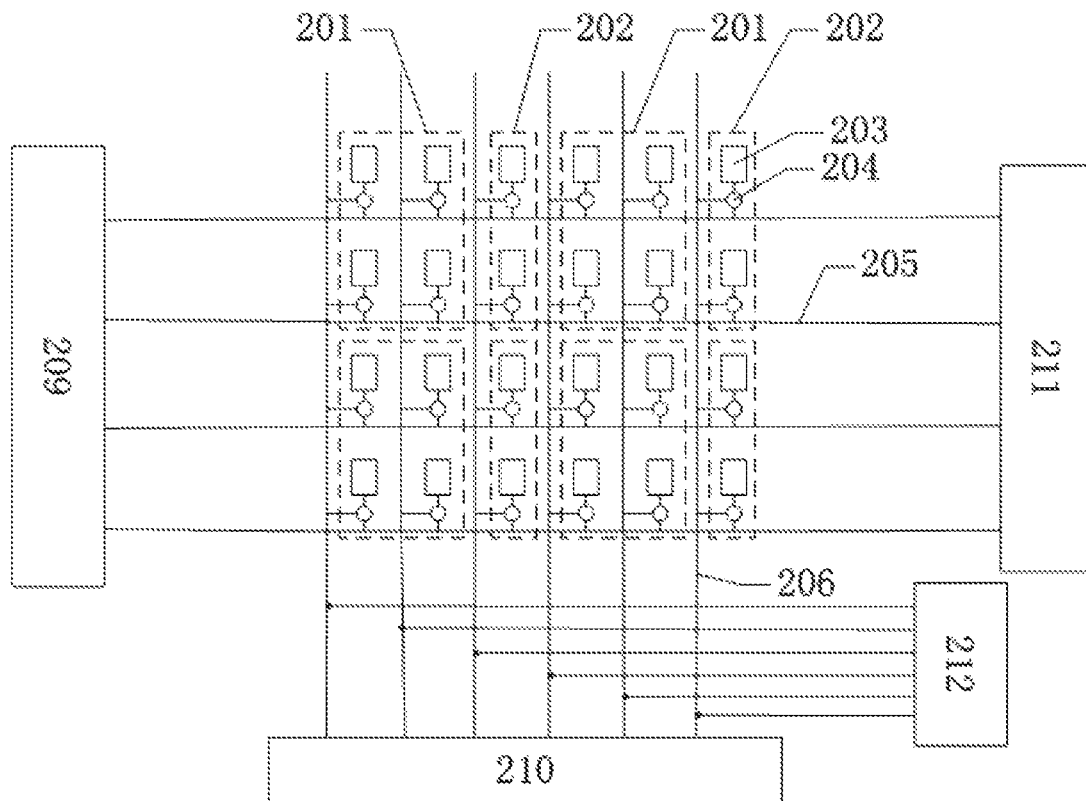
FIG. 4A is a schematic structural diagram of a third embodiment of a touch display panel according to the present invention.

FIG. 4A illustrates a schematic structural diagram of a touch display panel according to this embodiment.

This embodiment provides a touch display panel as illustrated in FIG. 4A which includes:

An array of pixels which includes a plurality of sets of scan lines 205, a plurality of sets of data lines 206 intersecting orthogonally with the plurality of sets of scan lines 205, and a plurality of pixel elements coupled respectively with the plurality of sets of scan lines 205 and the plurality of sets of data lines 206, wherein the plurality of sets of data lines 206 include a first type of sets and a second type of sets distributed to be spaced apart from each other. Specifically each of the plurality of pixel elements is arranged in an area surrounded by two adjacent scan lines 205 and two adjacent data lines 206, where each pixel element includes at least one pixel electrode 203 and one pixel switch 204, and the pixel electrode 203 is coupled respectively with the corresponding scan line 205 and data line 206 through the pixel switch 204. In this embodiment, each pixel element includes one pixel electrode 203 and one pixel switch 204, and each pixel electrode 203 corresponds respectively to one data line 206 and one scan line 205, and two adjacent pixel electrodes 203 correspond separately to one data line 206 and one scan line 205 respectively. Typically the pixel switch 204 can be a TFT. The pixel electrode 203 being coupled respectively with the corresponding scan line 205 and data line 206 through the pixel switch 204 particularly means that the pixel electrode 203 is coupled respectively with the corresponding scan line 205 and data line 206 through the TFT, and the TFT has a gate electronically connected with the scan line 205, a source electronically connected with the data line 206 and a drain electronically connected with the pixel electrode 203.

Particularly two adjacent pixel electrodes 203 corresponding separately to one data line 206 and one scan line 205 respectively refers to that the pixel electrodes 203 in the same row corresponds to the same scan line but corresponds respectively to different data lines; and the same column of pixel electrodes 203 corresponds to the same data line but corresponds respectively to different scan lines.

Each set of the plurality of sets of scan lines 205 includes one or more scan lines 205; and each set of the plurality of sets of data lines 206 includes one or more data lines 206.

The number of scan lines 205 in each set of scan lines 205 may be the same or different. Preferably the number of scan lines 205 in each set of scan lines 205 is the same.

In an optional implementation, the number of scan lines 205 in each set ranges from 2 to 1000. As illustrated in FIG. 4A, for example, there are two sets of scan lines 205 in total in the array of pixels, and there are two scan lines in each set, where the first set of scan lines includes two upper scan lines 205, and the second set of scan lines includes two lower scan lines 205.

The number of data lines 206 in each set of the same type of sets of data lines 206 is the same or different. Preferably, the number of data lines 206 in each set of the same type of sets of data lines 206 is the same.

In an optional implementation, the number of data lines 206 in each set ranges from 2 to 1000. For example, the data lines 206 in the array of pixels in FIG. 4A include four sets, where two sets are of the first type of sets and two sets are of the second type of sets distributed to be spaced apart from the first type of sets. Counting from the left to the right, the first set of the first type of sets of data lines 206 includes the first and the second data lines 206, and the second set of the first type of sets of data lines 206 includes the fourth and the fifth data lines 206; and counting from the left to the right, the first set of the second type of sets of data lines 206 includes the third data lines 206, and the second set of the second type of sets of data lines 206 includes the sixth data lines 206.

The touch panel further includes a first scan drive circuit 209 electrically connected with the plurality of sets of scan lines 205 to provide the respective sets of scan lines 205 with a first scan drive signal sequentially set by set.

The touch panel also includes a touch detection circuit 210 electrically connected with the plurality of sets of data lines 206, and when each set of scan lines 205 receives the first scan drive signal, the touch detection circuit 210 provides the first type of sets of the plurality of sets of data lines 206 with a touch drive signal and detects a touch sense signal from the second type of sets of the plurality of sets of data lines 206.

The touch panel also includes a second scan drive circuit 211 electrically connected with the plurality of sets of scan lines 205 to provide each set of scan lines 205 with a second scan drive signal after the set of scan lines 205 receives the first scan drive signal. Specifically the second scan drive circuit 211 provides the respective scan lines in each set of scan lines 205 with the second scan drive signal sequentially one by one after the set of scan lines 205 receives the first scan drive signal.

The touch panel also includes a data drive circuit 212 electrically connected with the plurality of sets of data lines 206 to provide the plurality of sets of data lines 206 with an image data signal when each row of scan lines 205 receives the second scan drive signal.

Specifically the first scan drive circuit 209 provides all the scan lines in a set of scan lines with the first scan drive signal at the same time.

In an embodiment, the first scan drive circuit 209 and the second scan drive circuit 211 are integrated in the same circuit.

"Sequentially set by set" mentioned in this application refers to operation set by set in a logic order of sets. As illustrated in FIG. 4A, for example, the first scan drive circuit 209 provides the respective sets of scan lines 205 with a first scan drive signal sequentially set by set, in other words, firstly the first scan drive circuit provides the first set of scan lines 205 with the first scan drive signal, and then the first scan drive circuit provides the second set of scan lines 205 with the first scan drive signal.

The array of pixels is divided by the first type of sets and the second type of sets of data lines in combination with the scan lines into four drive areas 201 and four sense areas 202, wherein the first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204; and the first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204. The pixel electrodes 203 in the drive areas 201 function as touch drive electrodes in a touch mode, and the pixel electrodes 203 in the sense areas 202 function as touch sense electrodes in the touch mode. Mutual capacitances are formed between the pixel electrodes 203 in the drive areas 201 and the pixel electrodes 203 in the sense areas 202.

In an optional implementation, the first type of sets are odd sets, and the second type of sets are even sets. Alternatively, the first type of sets are even sets, and the second type of sets are odd sets.

Figure 4B:
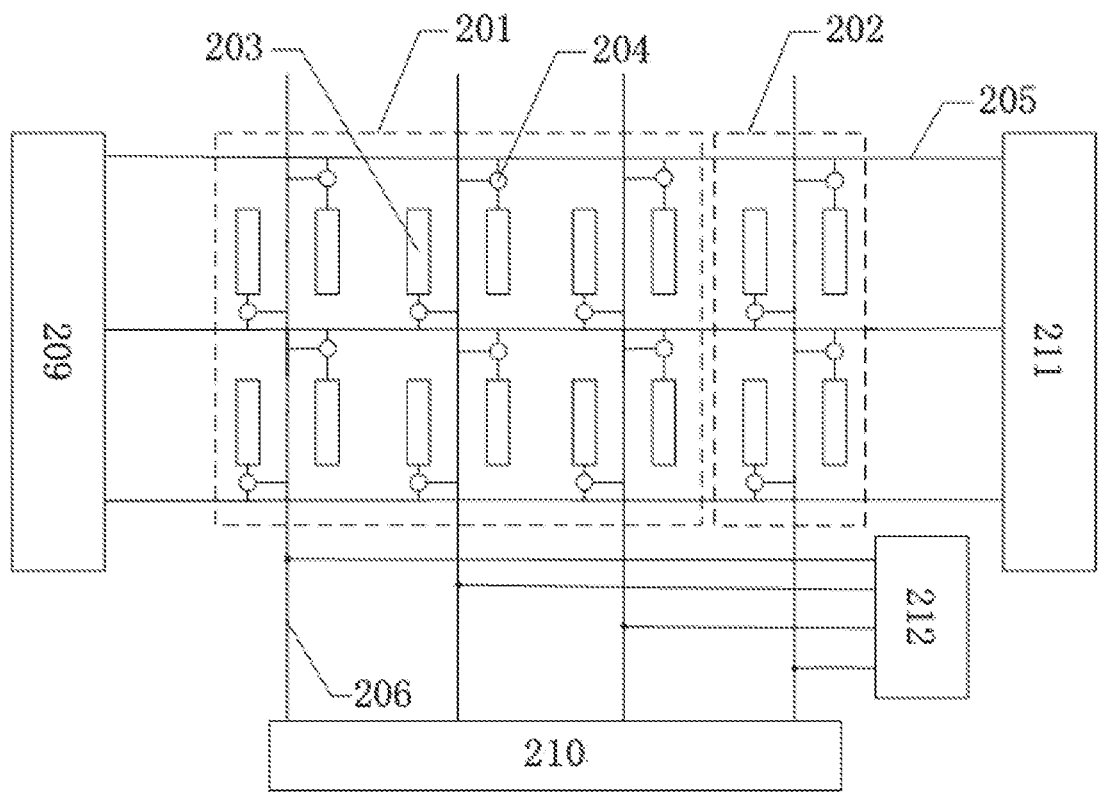
FIG. 4B a schematic structural diagram of an optional implementation of the third embodiment of a touch display panel according to the present invention.

FIG. 4B illustrates a schematic structural diagram of an optional implementation of the touch display panel according to this embodiment.

The touch panel illustrated in FIG. 4B includes an array of pixels including a plurality of sets of scan lines 205, a plurality of sets of data lines 206 intersecting vertically with the plurality of sets of scan lines 205, and a plurality of pixel elements coupled respectively with the plurality of sets of scan lines 205 and the plurality of sets of data lines 206, and each pixel element includes one pixel electrode 203 and one pixel switch 204. The touch display panel further includes a first scan drive circuit 209, a touch detection circuit 210, a second scan drive circuit 211 and a data drive circuit 212. For a description of the first scan drive circuit 209, the touch detection circuit 210, the second scan drive circuit 211 and the data drive circuit 212, a reference can be made to the embodiment corresponding to FIG. 4A above, and a repeated description thereof will be omitted here.

In an optional implementation, as illustrated in FIG. 4B, the array of pixels is distributed in a dual gate arrangement, that is, the pixel electrodes 203 in the same row share two scan lines 205, and every two adjacent columns of pixels share one data line 206. In FIG. 4B, counting from the left to the right, the pixel electrodes 203 in the same row located in an odd column are coupled with one of the scan lines 205 through the pixel switch 204, and the pixel electrodes 203 located in an even column are coupled with another scan line 205 through the pixel switch 204; and counting from the left to the right, all the pixel electrodes 203 in the first column and the second column are coupled with the first data line 206 through the pixel switches 204, all the pixel electrodes 203 in the third column and the fourth column are coupled with the second data line 206 through the pixel switches 204, and so on. As illustrated in FIG. 4B, there are further included a first scan drive circuit 209 electrically connected with the plurality of sets of scan lines 205; a touch detection circuit 210 electrically connected with the plurality of sets of data lines 206; a second scan drive circuit 211 electrically connected with the plurality of sets of scan lines 205; and a data drive circuit 212 electrically connected with the plurality of sets of data lines 206.

In the touch panel illustrated in FIG. 4B, a drive area 201 includes twelve pixel electrodes 203 coupled respectively with each scan line 205 and three data lines 206 from the left through the pixel switches 204. A sense area 202 includes four pixel electrodes 203 coupled respectively with each scan line 205 and the fourth data line 206 from the through the pixel switches 204. For a description of the drive area 201 and the sense area 202, a reference can be made to the embodiment corresponding to FIG. 4A above, and a repeated description thereof will be omitted here.

Figure 4C:
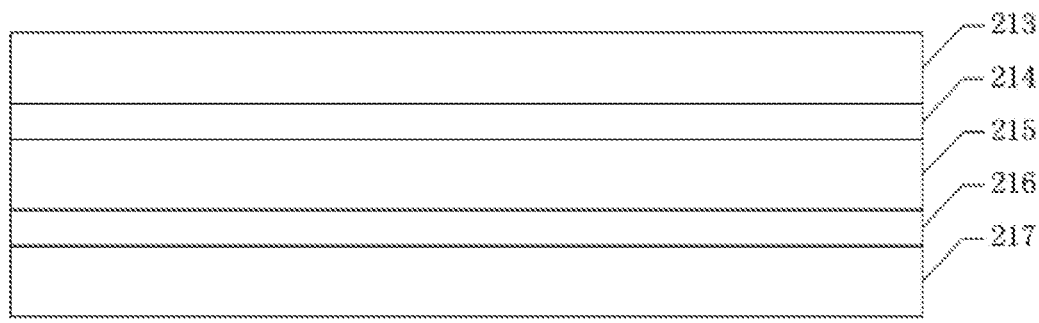
FIG. 4C a schematic structural diagram of an optional implementation of the third embodiment of a touch display panel according to the present invention.
Figure 4D:
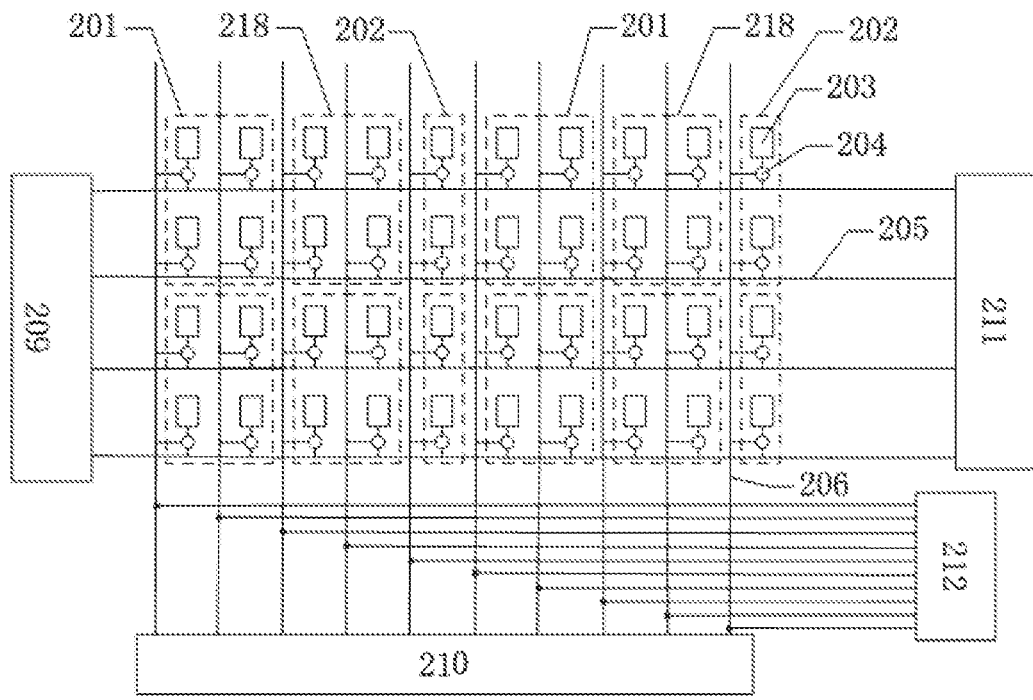
FIG. 4D a schematic structural diagram of an optional implementation of the third embodiment of a touch display panel according to the present invention.

FIG. 4D is a schematic structural diagram of an optional implementation of the touch display panel according to this embodiment.

Based upon the embodiment corresponding to FIG. 4A, in an optional implementation, the plurality of sets of data lines further include a third type of sets which are located between the first type of sets and the second type of sets and to which the touch detection circuit 210 applies a fixed potential.

As illustrated in FIG. 4D, the array of pixels is divided by the first type of sets, the second type of sets and the third type of sets of data lines in combination with the scan lines into four drive areas 201, four sense areas 202 and four fixed-potential areas 218. Counting from the left to the right, there are the first to the tenth data lines illustrated; and counting from the top to the bottom, there are the first to the fourth scan lines illustrated in total.

The first set of the first type of sets of data lines 206 includes the first and the second data lines 206. The first set of the third type of sets of data lines 206 includes the third and the fourth data lines 206. The first set of the second type of sets of data lines 206 includes the fifth data line 206. The second set of the first type of sets of data lines 206 includes the sixth and the seventh data lines 206. The second set of the third type of sets of data lines 206 includes the eighth and the ninth data lines 206. The second set of the second type of sets of data lines 206 includes the tenth data line 206.

The first set of scan lines 205 includes the first and the second scan lines 205. The second set of scan lines 205 includes the third and the fourth scan lines 205.

The first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204.

The first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204.

The first fixed-potential area 218 includes four pixel electrodes 203 coupled respectively with the first set of scan lines 205 and the first set of the third type of sets of data lines 206 through the pixel switches 204, the second fixed-potential area 218 includes four pixel electrodes 203 coupled respectively with the first set of scan lines 205 and the second set of the third type of sets of data lines 206 through the pixel switches 204, the third fixed-potential area 218 includes four pixel electrodes 203 coupled respectively with the second set of scan lines 205 and the first set of the third type of sets of data lines 206 through the pixel switches 204, and the fourth fixed-potential area 218 includes four pixel electrodes 203 coupled respectively with the second set of scan lines 205 and the second set of the third type of sets of data lines 206 through the pixel switches 204.

The pixel electrodes 203 in the drive areas 201 function as touch drive electrodes in a touch mode; the pixel electrodes 203 in the sense areas 202 function as touch sense electrodes in the touch mode; and the fixed potential is applied to the pixel electrodes 203 in the fixed-potential area 218 in the touch mode, and typically the fixed potential is a grounded potential.

Figure 4E:
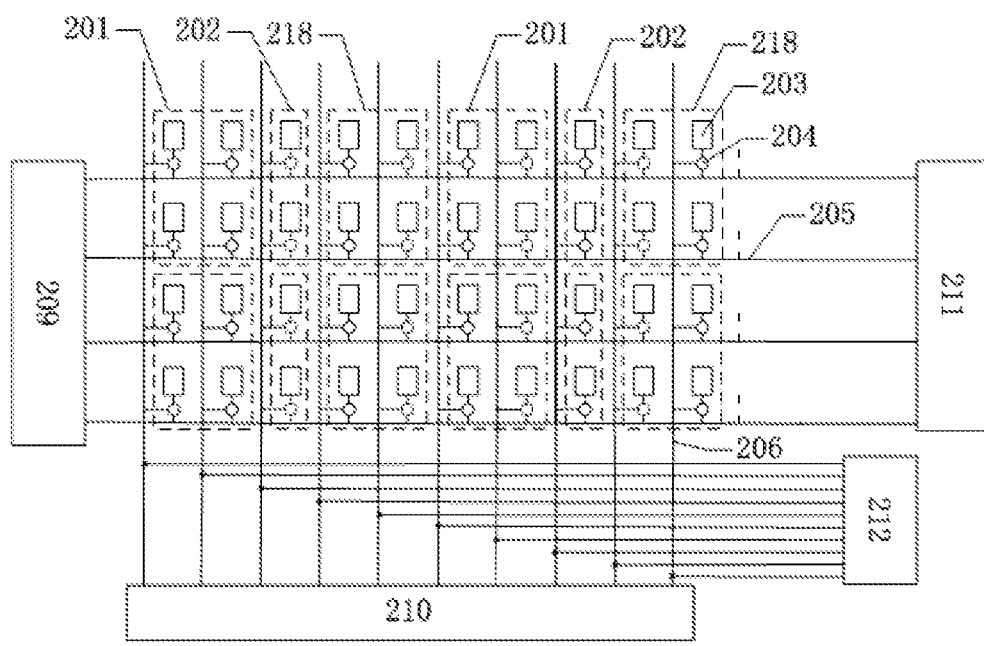
FIG. 4E a schematic structural diagram of an optional implementation of the third embodiment of a touch display panel according to the present invention.

FIG. 4E is a schematic structural diagram of an optional implementation of the touch display panel according to this embodiment.

Based upon the embodiment corresponding to FIG. 4A, as illustrated in FIG. 4E, the plurality of sets of data lines further include a third type of sets, and the second type of sets are located between the first type of sets and the third type of sets; and the touch detection circuit 210 applies a fixed potential to the third type of sets.

As illustrated in FIG. 4E, the array of pixels is divided by the first type of sets, the second type of sets and the third type of sets of data lines in combination with the scan lines into four drive areas 201, four sense areas 202 and four fixed-potential areas 218. Counting from the left to the right, there are the first to the tenth data lines illustrated; and counting from the top to the bottom, there are the first to the fourth scan lines illustrated in total.

The first set of the first type of sets of data lines 206 includes the first and the second data lines 206. The first set of the third type of sets of data lines 206 includes the fourth and the fifth data lines 206. The first set of the second type of sets of data lines 206 includes the third data line 206. The second set of the first type of sets of data lines 206 includes the sixth and the seventh data lines 206. The second set of the third type of sets of data lines 206 includes the ninth and the tenth data lines 206. The second set of the second type of sets of data lines 206 includes the eighth data line 206.

The first set of scan lines 205 includes the first and the second scan lines 205. The second set of scan lines 205 includes the third and the fourth scan lines 205.

The first drive area 201 includes four pixel electrodes 203 coupled respectively with the first set of scan lines 205 and the first set of the first type of sets of data lines 206 through the pixel switches 204, the second drive area 201 includes four pixel electrodes 203 coupled respectively with the first set of scan lines 205 and the second set of the first type of sets of data lines 206 through the pixel switches 204, the third drive area 201 includes four pixel electrodes 203 coupled respectively with the second set of scan lines 205 and the first set of the first type of sets of data lines 206 through the pixel switches 204, and the fourth drive area 201 includes four pixel electrodes 203 coupled respectively with the second set of scan lines 205 and the second set of the first type of sets of data lines 206 through the pixel switches 204.

The first sense area 202 includes two pixel electrodes 203 coupled respectively with the first set of scan lines 205 and the first set of the second type of sets of data lines 206 through the pixel switches 204, the second sense area 202 includes two pixel electrodes 203 coupled respectively with the first set of scan lines 205 and the second set of the second type of sets of data lines 206 through the pixel switches 204, the third sense area 202 includes two pixel electrodes 203 coupled respectively with the second set of scan lines 205 and the first set of the second type of sets of data lines 206 through the pixel switches 204, and the fourth sense area 202 includes two pixel electrodes 203 coupled respectively with the second set of scan lines 205 and the second set of the second type of sets of data lines 206 through the pixel switches 204.

The first fixed-potential area 218 includes four pixel electrodes 203 coupled respectively with the first set of scan lines 205 and the first set of the third type of sets of data lines 206 through the pixel switches 204, the second fixed-potential area 218 includes four pixel electrodes 203 coupled respectively with the first set of scan lines 205 and the second set of the third type of sets of data lines 206 through the pixel switches 204, the third fixed-potential area 218 includes four pixel electrodes 203 coupled respectively with the second set of scan lines 205 and the first set of the third type of sets of data lines 206 through the pixel switches 204, and the fourth fixed-potential area 218 includes four pixel electrodes 203 coupled respectively with the second set of scan lines 205 and the second set of the third type of sets of data lines 206 through the pixel switches 204.

The pixel electrodes 203 in the drive areas 201 function as touch drive electrodes in a touch mode; the pixel electrodes 203 in the sense areas 202 function as touch sense electrodes in the touch mode; and the fixed potential is applied to the pixel electrodes 203 in the fixed-potential area 218 in the touch mode, and typically the fixed potential is a grounded potential.

In another optional implementation of the touch panel according to an embodiment of the present invention, like the embodiment as illustrated in FIG. 4E, the plurality of sets of data lines further include a third type of sets, and the first type of sets are located between the second type of sets and the third type of sets; and the touch detection circuit applies a fixed potential to the third type of sets. For a particular implementation thereof, reference can be made to the embodiment illustrated in FIG. 2E, and a repeated description thereof will be omitted here.

In an optional implementation, the touch display panel further includes a control circuit (not illustrated) electrically connected with the first scan drive circuit 209, the second scan drive circuit 211, the touch detection circuit 210 and the data drive circuit 212 to coordinate operating timing among the first scan drive circuit 209, the second scan drive circuit 211, the touch detection circuit 210 and the data drive circuit 212.

FIG. 4C illustrates a schematic structural diagram of an optional implementation of the touch display panel according to this embodiment.

In an optional implementation, the touch display panel includes a first substrate 213, a second substrate 217 opposite to the first substrate 213, an array of pixels 214, a common electrode layer 216 and a liquid crystal layer 215, and the array of pixels 214 is disposed on the surface of the first substrate 213 facing the second substrate 217. The common electrode layer 216, the liquid crystal layer 215, the array of pixels 214 and the first substrate 213 are disposed sequentially on the second substrate 21T The first substrate 213 may optionally be a color fitter (CF) substrate and CF may be in color or white and black.

In an optional implementation, this embodiment further provides a segment of the array of pixels as illustrated in FIG. 2B, where each set of the first type of sets of data lines 206 and the second type of sets of data lines 206 includes three data tines, and each set of scan lines 205 also includes three scan lines. FIG. 2B illustrates a segment of the array of pixels, which includes two sets of scan lines 205 (not illustrated), one first type of set of data lines 206 (the first to third data lines 206 starting from the left) and one second type of set of data lines 206 (the fourth to sixth data lines 206 starting from the left), wherein each pixel element includes one TFT switch (not illustrated) and one pixel electrode 203. When the first drive signal is applied correspondingly to the first set of scan lines 205 and the second set of scan lines 205 are floating, then all the pixel electrodes 203 corresponding to the first set of scan lines 205 are turned on, and the pixel electrodes 203 corresponding to the second set of scan lines 205 are turned off. Then the touch detection circuit applies the touch drive signal to the first type of set of data lines 206 to thereby apply the touch drive signal to the drive areas 201. Next the touch sense circuit detects the touch sense signal from the sense areas 202 through the second type of set of data lines 206. Mutual capacitances are formed between the pixel electrodes 203 in the drive areas 201 and the pixel electrodes 203 in the sense areas 202 on that a touch action of a finger or a stylus in the first touch area 207 can be detected by the touch detection circuit. A touch action of the finger or the stylus in the second touch area 208, together with a change in mutual capacitance between the first type of sets of data lines 206 and the second type of sets of data lines 206, will also be detected by the touch detection circuit 210, which results from significantly smaller mutual capacitances between the data lines 206 (that is, of areas surrounded by the second sets of scan lines 205) than those between the large-area pixel electrodes 203 (that is, of areas surrounded by the first sets of scan lines 205). Thus, the signal of the second touch area 208 can be distinguished from that in the first touch area 207.

Fourth Embodiment

Figure 5A:
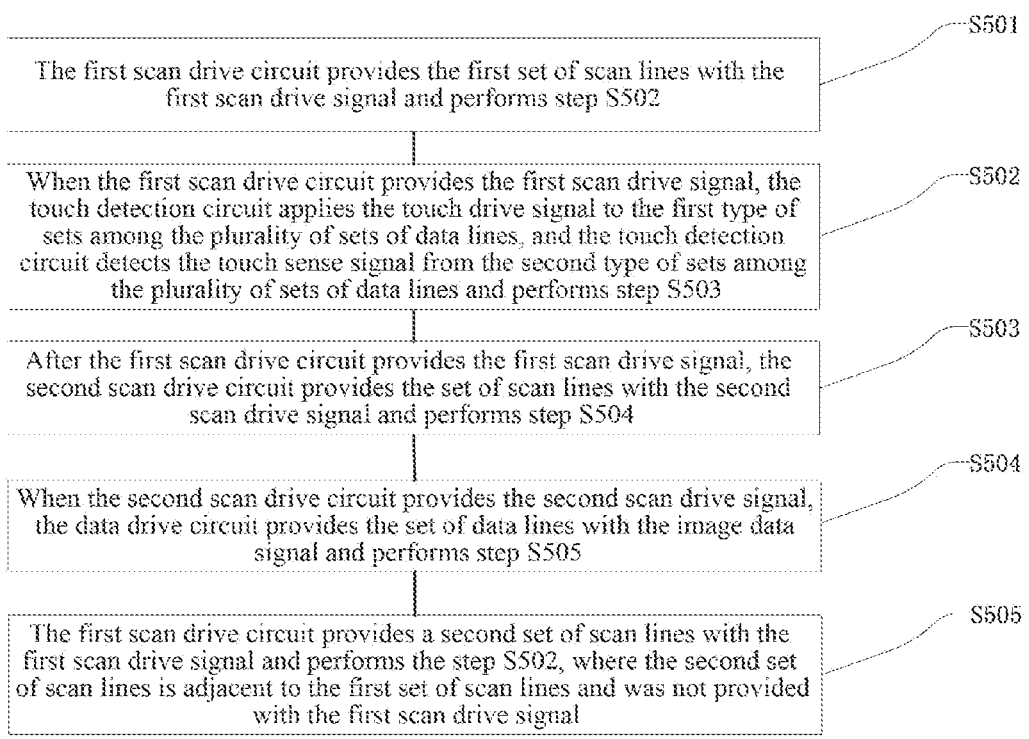
FIG. 5A is a flow chart of steps in a fourth embodiment of a touch detection and display method of a touch display panel according to the present invention.

FIG. 5A illustrates a flow chart of steps in a touch detection and display method of a touch display panel according to this embodiment.

This embodiment provides a touch detection and display method of a touch display panel, which includes the following steps:

Step S501, the first scan drive circuit provides the first set of scan lines with the first scan drive signal. At step S501, all the scan lines in the first set of scan lines 205 receive the first scan drive signal at the same time when the set of scan lines 205 receives the first scan drive signal.

Step S502, when the first scan drive circuit provides the first scan drive signal, the touch detection circuit applies the touch drive signal to the first type of sets among the plurality of sets of data lines, and the touch detection circuit detects the touch sense signal from the second type of sets among the plurality of sets of data lines.

Furthermore at step S502, the touch detection circuit 210 provides the first type of sets of the plurality of sets of data lines 206 with the touch drive signal and applies the touch drive signal to the pixel electrodes 203 in the drive areas 201 through the first type of sets of data lines 206, where the pixel electrodes 203 in the drive areas 201 function as touch drive electrodes.

In an optional implementation, at step S502, when the first scan drive circuit 209 provides the first scan drive signal, the touch detection circuit provides the first type of sets among the plurality of sets of data lines with the touch drive signal, and at the same time the touch detection circuit detects the touch sense signal from the second type of sets among the plurality of sets of data lines.

In an optional implementation, at step S502, when the first scan drive circuit 209 provides the first scan drive signal, firstly the touch detection circuit provides the first type of sets among the plurality of sets of data lines with the touch drive signal, and then the touch detection circuit detects the touch sense signal from the second type of sets among the plurality of sets of data lines.

Furthermore at step S502, the pixel electrodes 203 of the sense areas 202 transmits the touch sense signal to the second type of sets of data lines 206, and at this time the pixel electrodes 203 of the sense areas 202 function as touch sense electrodes; and the touch detection circuit 210 detects the touch sense signal from the second type of sets of the plurality of sets of data lines 206.

Step S503, after the first scan drive circuit provides the first scan drive signal, the second scan drive circuit provides the set of scan lines with the second scan drive signal and performs step S504. In the step S503, all the scan lines 205 in the set of scan lines 205 receive the second scan drive signal sequentially one by one when the set of scan lines 205 receives the second scan drive signal.

Step S504, when the second scan drive circuit provides the second scan drive signal, the data drive circuit provides the plurality of sets of data lines with the image data signal and performs step S505.

In an optional implementation, in the step S504, the data drive circuit 212 can provide the plurality of sets of data lines with the image data signal at the same time or separate times.

Step S505, the first scan drive circuit provides a second set of scan lines with the first scan drive signal and performs step S502, wherein the second set of scan lines is adjacent to the first set of scan lines and was not provided with the first scan drive signal.

Another touch detection and display method of a touch display panel according to an embodiment of the present invention includes the following operations:

The first scan drive circuit provides a set of scan lines with the first scan drive signal. In this step, the first scan drive circuit provides all the scan lines 205 in the set of scan lines 205 with the first scan drive signal at the same time.

When the first scan drive circuit provides the first scan drive signal, the touch detection circuit applies the touch drive signal to the first type of sets among the plurality of sets of data lines, and the touch detection circuits detects the touch sense signal from the second type of sets among the plurality of sets of data lines.

The second scan drive circuit provides the set of scan lines with the second scan drive signal after the first scan drive circuit provides the set of scan lines with the first scan drive signal.

The data drive circuits provides the plurality of sets of data lines with the image data signal when the second scan drive circuit provides the second scan drive signal.

Then the first scan drive circuit provides a next set of scan lines with the first scan drive signal, and when the first scan drive circuit provides the first scan drive signal, the touch detection circuit applies the touch drive signal to the first type of sets among the plurality of sets of data lines, and the touch detection circuits detects the touch sense signal from the second type of sets among the plurality of sets of data lines, wherein the two sets of scan lines are adjacent, and the next set of scan lines was not provided with the first scan drive signal.

Figure 5B:
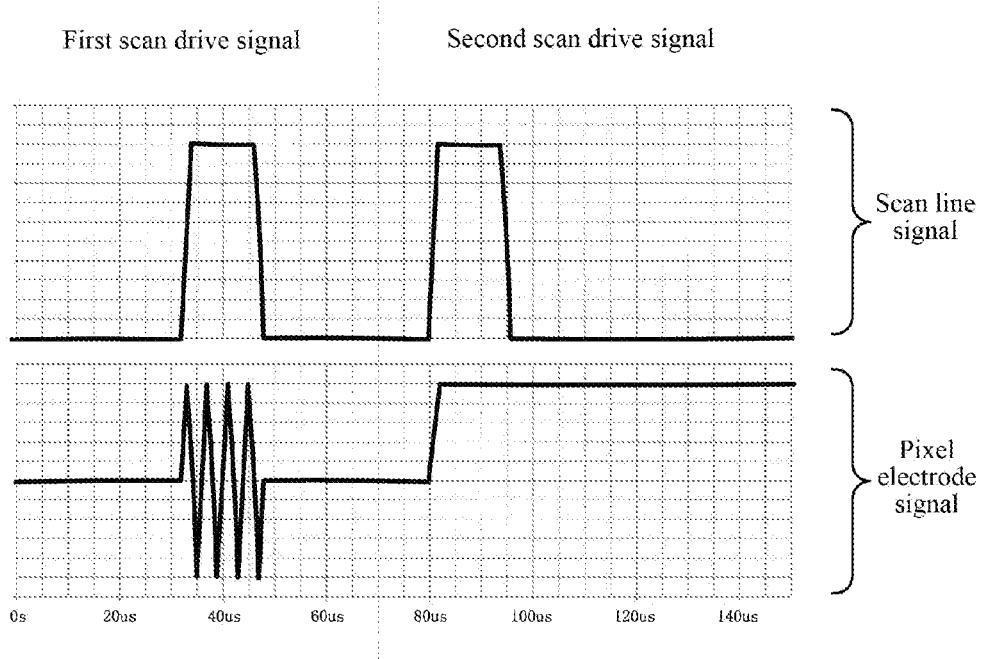
FIG. 5B is a timing diagram of the fourth embodiment of a touch detection and display method of a touch display panel according to the present invention.

FIG. 5B illustrates a timing diagram of a touch detection and display method of a touch display panel according to this embodiment. When the scan lines 205 receive the first scan drive signal, the array of pixels is in the touch mode, and the corresponding pixel electrodes 203 have a relatively active signal, and the signal of the pixel electrodes 203 appears to oscillate like a sinusoidal curve; and when the scan lines 205 receive the second scan drive signal, the array of pixels is in a display mode, and the corresponding pixel electrodes 203 have a relatively stable signal, and the signal of the pixel electrodes 203 appears as a signal at a high potential.

Evidently, those skilled in the art can make various modifications and variations to the embodiments of the present invention without departing from the spirit and scope of the embodiments of the present invention. Thus, the present invention is intended to encompass these modifications and variations to the embodiments thereof so long as the modifications and variations come into the scope of the claims appended to the present invention and their equivalents.

What is claimed is:

1. A touch panel, comprising:
an array of pixels comprising a plurality of sets of scan lines, a plurality of sets of data lines intersecting orthogonally with the plurality of sets of scan lines, and a plurality of pixel elements coupled respectively with the plurality of sets of scan lines and the plurality of sets of data lines, wherein the plurality of sets of data lines comprises a first type of sets and a second type of sets disposed apart from each other;
a scan drive circuit electrically connected with the plurality of sets of scan lines to provide each set of the plurality of sets of scan lines with a first scan drive signal sequentially set by set, wherein all scan lines in a set of scan lines are provided with the first scan drive signal at the same time when the set of scan lines is provided with the first scan drive signal; and
a touch detection circuit electrically connected with the plurality of sets of data lines and configured to provide the first type of sets of the plurality of sets of data lines with a touch drive signal and to detect a touch sense signal from the second type of sets of the plurality of sets of data lines when each set of the plurality of sets of scan lines receives the first scan drive signal.

2. The touch panel according to claim 1, wherein the plurality of sets of data lines further comprises a third type of sets, and the third type of sets is located between the first type of sets and the second type of sets; or the second type of sets is located between the first type of sets and the third type of sets; or the first type of sets is located between the second type of sets and the third type of sets.

3. The touch panel according to claim 2, wherein the touch detection circuit applies a fixed potential to the third type of sets of the plurality of sets of data lines.

4. The touch panel according to claim 1, wherein each set of the plurality of sets of scan lines comprises one or more scan lines; each set of the plurality of sets of data lines comprises one or more data lines; and the number of scan lines in each set of the plurality of sets of scan lines is the same.

5. The touch panel according to claim 1, wherein each set of the plurality of sets of scan lines comprises one or more scan lines; each set of the plurality of sets of data lines comprises one or more data lines; and the number of data lines in each set of the plurality of sets of data lines among the same type of sets is the same.

6. The touch panel according to claim 1, wherein the touch panel further comprises a control circuit electrically connected with the first scan drive circuit and the touch detection circuit, the control circuit configured to coordinate operating timing between the first scan drive circuit and the touch detection circuit.

7. The touch panel according to claim 1, wherein each of the pixel elements comprises at least one pixel electrode and at least one pixel switch, the at least one pixel electrode coupled with a scan line and a data line through the at least one pixel switch.

8. A touch detection method for a touch panel having an array of pixels including a plurality of sets of data lines and a plurality of sets of scan lines intersecting orthogonally each other, a plurality of pixel elements each coupled with one of the sets of scan lines and one of the sets of data lines, the sets of data lines comprising a first type of sets and a second type of sets disposed apart from each other, the touch panel also having a scan drive circuit electrically connected with the sets of scan lines to provide each of the sets of scan lines with a first scan drive signal sequentially set by set and a touch detection circuit electrically connected with the sets of data lines for providing the first type of sets of the sets of data lines with a touch drive signal and for detecting a touch sense signal from a second type of sets of the sets of data lines when each set of the sets of scan lines receives the first scan drive signal, the touch detection method comprising:
- step 1, providing, by the scan drive circuit, one set of scan lines with the first scan drive signal;
- step 2, when the first scan drive circuit provides the first scan drive signal, providing, by the touch detection circuit, the first type of sets with the touch drive signal, and detecting, by the touch detection circuit, the touch sense signal from the second type of sets; and
- step 3, providing, by the first scan drive circuit, a next set of scan lines with the first scan drive signal, and performing the step 2, wherein the two sets of scan lines are adjacent, and the next set of scan lines was not provided with the first scan drive signal, wherein all scan lines in a set of scan lines are provided with the first scan drive signal at the same time when the set of scan lines is provided with the first scan drive signal.

9. The method according to claim 8, wherein:
the step 1 further comprises: providing, by the first scan drive circuit, a first set of scan lines with the first scan drive signal; and
the step 3 further comprises: providing, by the first scan drive circuit, a second set of scan lines with the first scan drive signal and performing the step 2, wherein the second set of scan lines is adjacent to the first set of scan lines and was not provided with the first scan drive signal.

10. A touch display panel, comprising:
an array of pixels comprising a plurality of sets of scan lines, a plurality of sets of data lines intersecting orthogonally with the plurality of sets of scan lines, and a plurality of pixel elements coupled respectively with the plurality of sets of scan lines and the plurality of sets of data lines, wherein the plurality of sets of data lines comprise a first type of sets and a second type of sets arranged apart from each other;
a first scan drive circuit electrically connected with the plurality of sets of scan lines and configured to provide each set of the plurality of sets of scan lines with a first scan drive signal sequentially set by set, wherein the first scan drive circuit provides each scan line in a set of scan lines with the first scan drive signal at the same time when the first scan drive circuit provides the a set of scan lines with the first scan drive signal; and
a touch detection circuit electrically connected with the plurality of sets of data lines and configured to provide the first type of sets among the plurality of sets of data lines with a touch drive signal and to detect a touch sense signal from the second type of sets of the plurality of sets of data lines when each set of scan lines receives the first scan drive signal;
a second scan drive circuit electrically connected with the plurality of sets of scan lines to provide each set of scan lines with a second scan drive signal after each set of scan lines receives the first scan drive signal; and
a data drive circuit electrically connected with the plurality of sets of data lines to provide the plurality of sets of data lines with an image data signal after each row of scan lines receives the second scan drive signal.

11. The touch display panel according to claim 10, wherein the plurality of sets of data lines further comprise a third type of sets, and the third type of sets is located between the first type of sets and the second type of sets; or the second type of sets is located between the first type of sets and the third type of sets; or the first type of sets is located between the second type of sets and the third type of sets.

12. The touch display panel according to claim 11, wherein the touch detection circuit applies a fixed potential to the third type of sets of the plurality of sets of data lines.

13. The touch display panel according to claim 10, wherein each set of the plurality of sets of scan lines comprises one or more scan lines; each set of the plurality of sets of data lines comprises one or more data lines; and the number of scan lines in each set of scan lines is the same.

14. The touch display panel according to claim 10, wherein each set of the plurality of sets of data lines comprises one or more scan lines; each set of the plurality of sets of data lines comprises one or more data lines; and the number of data lines in each set of the same type of sets of data lines is the same.

15. The touch display panel according to claim 10, wherein the second scan drive circuit provides each scan line in the set of scan lines with the second scan drive signal sequentially row by row after each set of scan lines receive the first scan drive signal at the same time.

16. The touch display panel according to claim 10, wherein the touch display panel further comprises a control circuit electrically connected with the first scan drive circuit, the second scan drive circuit, the touch detection circuit and the data drive circuit, the control circuit configured to coordinate operating timing among the first scan drive circuit, the second scan drive circuit, the touch detection circuit and the data drive circuit.

17. A touch detection method of the touch display panel containing an array of pixels having a plurality of sets of scan lines and a plurality of data lines intersecting orthogonally each other, a plurality of pixel elements each coupled with one of the sets of scan lines and one of the sets of data lines, the sets of data lines comprising a first type of sets and a second type of sets disposed apart from each other, the touch display panel also containing a first scan drive circuit electrically connected with the sets of scan lines for providing each of the sets of scan lines with a first scan drive signal sequentially set by set, a touch detection circuit electrically connected with the sets of data lines for providing the first type of sets with a touch drive signal and for detecting a touch sense signal from the second type of sets, a second scan drive circuit electrically connected with the sets of scan lines to provide each set of scan lines with a second scan drive signal after each set of scan lines receives the first scan drive signal, and a data drive circuit electrically connected with the sets of data lines to provide the sets of data lines with an image data signal after each row of scan lines receives the second drive signal, the touch detection method comprising:

step 1, providing, by the first scan drive circuit, one set of scan lines with the first scan drive signal;

step 2, when the first scan drive circuit provides the first scan drive signal, applying, by the touch detection circuit, the touch drive signal to the first type of sets, and detecting, by the touch detection circuit, the touch sense signal from the second type of sets;

step 3, after the first scan drive circuit provides the first scan drive signal, providing, by the second scan drive circuit, the second set of scan lines with the second scan drive signal;

step 4, when the second scan drive circuit provides the second scan drive signal, providing, by the data drive circuit, the plurality of sets of data lines with the image data signal; and step 5, providing, by the first scan drive circuit, a next set of scan lines with the first scan drive signal, and performing the step 2, wherein the two sets of scan lines are adjacent, and the next set of scan lines was not provided with the first scan drive signal, wherein all scan lines in a set of scan lines are provided with the first scan drive signal at the same time when the set of scan lines is provided with the first scan drive signal.

18. The method according to claim 17, wherein:

the step 1 further comprises: providing, by the first scan drive circuit, the first set of scan lines with the first scan drive signal and performing the step 2; and the step 5 further comprises: providing, by the first scan drive circuit, the second set of scan lines with the first scan drive signal and performing the step 2, wherein the second set of scan lines is adjacent to the first set of scan lines and was not provided with the first scan drive signal.

19. The method according to claim 18, wherein in the step 3, the second scan drive circuit provides the one or more scan lines in the first set of scan lines with the second scan drive signal sequentially row by row after the first set of scan lines receives the first scan drive signal at the same time.

* * * * *